(12) United States Patent
Hayashi et al.

(10) Patent No.: US 6,632,272 B2
(45) Date of Patent: Oct. 14, 2003

(54) LIGHT COLOR EMULSION INK FOR STENCIL PRINTING, AND METHOD OF STENCIL PRINTING

(75) Inventors: Yoshihiro Hayashi, Ibaraki-ken (JP); Hirotoshi Yonekawa, Ibaraki-ken (JP)

(73) Assignee: Riso Kagaku Corporation (JP)

( * ) Notice: Subject to any disclaimer, the term of this patent is extended or adjusted under 35 U.S.C. 154(b) by 160 days.

(21) Appl. No.: 09/919,947

(22) Filed: Aug. 2, 2001

(65) Prior Publication Data

US 2002/0033115 A1 Mar. 21, 2002

(30) Foreign Application Priority Data

Aug. 2, 2000  (JP) ........................................ 2000-233977

(51) Int. Cl.[7] .............................................. C09D 11/00
(52) U.S. Cl. ................. 106/31.26; 106/31.6; 106/31.64
(58) Field of Search ............................ 106/31.26, 31.6, 106/31.64

(56) References Cited

U.S. PATENT DOCUMENTS

| | | | |
|---|---|---|---|
| 5,637,137 A | * 6/1997 | Okuda et al. | ............. 106/31.26 |
| 5,667,570 A | * 9/1997 | Okuda et al. | ............. 106/31.26 |
| 5,759,245 A | 6/1998 | Okuda et al. | |

| | | | |
|---|---|---|---|
| 6,454,843 B2 | * 9/2002 | Matsuda | ................... 106/31.43 |

FOREIGN PATENT DOCUMENTS

| | | |
|---|---|---|
| EP | 0 726 300 | 8/1996 |
| EP | 0 741 174 | 11/1996 |
| EP | 0 791 639 | 8/1997 |
| EP | 0 795 590 | 9/1997 |
| EP | 0 816 450 | 1/1998 |
| EP | 0 816 451 | 1/1998 |
| EP | 1 113 057 | 7/2001 |
| JP | 6-172693 A | 6/1994 |
| JP | 7-150091 A | 6/1995 |
| JP | 9-227818 | 9/1997 |
| JP | 2000-53903 | 2/2000 |

OTHER PUBLICATIONS

European Search Report, Application No. 01118556.8–2102, Date: Apr. 18, 2002.

* cited by examiner

*Primary Examiner*—Helene Klemanski
(74) *Attorney, Agent, or Firm*—Nixon & Peabody LLP; Donald R. Studebaker

(57) ABSTRACT

A light color W/O emulsion ink for stencil printing, includes chromatic pigment in an amount not smaller than 0.1% and smaller than 1% by weight of the total weight of the ink and white pigment in an amount not smaller than 7% and not larger than 20% by weight of the total weight of the ink.

6 Claims, No Drawings

LIGHT COLOR EMULSION INK FOR STENCIL PRINTING, AND METHOD OF STENCIL PRINTING

BACKGROUND OF THE INVENTION

1. Field of the Invention

This invention relates to light color W/O emulsion ink for stencil printing, and more particularly to light color stencil printing W/O emulsion ink which is excellent in weather resistance and is not affected by whiteness or color of the printing paper.

2. Description of the Related Art

The stencil printing is advantageous over other printing systems such as offset printing, gravure printing, letterpress printing and the like in that it permits to easily make prints without a skilled operator and complicated cleaning after printing is not necessary.

From the advent of the thermal stencil making system using a thermal head, image processing in the stencil printing has come to be digitized, whereby it has become feasible to easily obtain high quality printings in a short time, which makes it feasible to use the stencil printer as an information processing terminal.

Further, in the thermal stencil making system using a thermal head, perforations can be more regular in size and accordingly the amount of ink transferred to the printing paper can be more accurately controlled than in the conventional stencil making system in which infrared rays or xenon flash is employed to perforate the stencil material. Thus by using the thermal stencil making system, probability of generation of offset and/or spread of ink is reduced and the quality of printings is greatly improved.

Recently, there has been an increasing demand for inks of various colors, e.g., light color inks such as of light blue, slightly purplish light red and the like. As the stencil printing ink, W/O emulsion ink is generally used. Though there have been proposed various color inks, for instance, in Japanese Unexamined Patent Publication Nos. 6(1994)-172693, 7(1995)-150091, 9(1997)-227818 and 2000-53903, there has been made no specific proposal on light color ink for stencil printing.

Recently, an increasing number of users have come to use printing papers which are low in whiteness since they are manufactured without use of bleaching agent in order to suppress environmental pollution, or color printing papers, for instance, in order to enhance the advertising effect.

There has been a problem that light color ink is apt to be affected by the whiteness or color of the printing paper and accordingly it is difficult to obtain an expected color when a light color ink is transferred to a low whiteness printing paper or a color printing paper. Further, in the case of a light color ink which is small in the chromatic pigment content, change with time of the pigments largely affects the color of the ink and the color of the ink is apt to change.

SUMMARY OF THE INVENTION

In view of the foregoing observations and description, the primary object of the present invention is to provide light color stencil printing emulsion ink which produces the same color irrespective of the kind or the color of the printing paper and the color development performance of which is stable against time.

In accordance with the present invention, there is provided a light color W/O emulsion ink for stencil printing, characterized by containing therein chromatic pigment in an amount not smaller than 0.1% and smaller than 1% by weight of the total weight of the ink and white pigment in an amount not smaller than 7% and not larger than 20% by weight of the total weight of the ink.

It is preferred that the content of the oil phase be 15 to 50% by weight and the content of the water phase is 50 to 85% by weight.

It is preferred that the white pigment be titanium oxide.

It is preferred that the chromatic pigment be at least one of a pigment selected from the group consisting of anthraquinone series pigments, perinone.perylene series pigments, phthalocyanine series pigments, dioxazine series pigments, quinacridone series pigments and isoindolinone series pigments.

When two or more chromatic pigments are contained, it is preferred that the chromatic pigments be different from each other in hue. The "hue" as used here means 10 colors, i.e., yellow, green yellow, green, blue green, blue, purple blue, purple, red purple, red and yellow red. When two or more chromatic pigments are contained, they may be either of the same series or of the different series.

The light color W/O emulsion ink for stencil printing of this embodiment is especially suitable for printing on a low whiteness printing paper or a color printing paper.

The light color W/O emulsion ink for stencil printing produces the same color irrespective of the kind or the color of the printing paper. It may be considered that this is because the color of the printing paper is covered with the opaque white pigment. When printing with the emulsion ink of this invention, a color image of a desired hue, a desired chroma and a desired brightness can be obtained even if printing is made on a low whiteness printing paper which is not higher than 70 (especially 60) in Hunter whiteness or a color printing paper such as of red, blue or yellow.

When titanium oxide which is excellent in whiteness, hiding power, coloring power and weather resistance, is employed as the white pigment, the aforesaid effect is further enhanced.

Since anthraquinone series pigments, perinone.perylene series pigments, phthalocyanine series pigments, dioxazine series pigments, quinacridone series pigments and isoindolinone series pigments are excellent in weather resistance in a W/O emulsion ink, and are less apt to discolor, the emulsion ink containing therein such a chromatic pigment is stable in its hue, chroma, brightness and color development performance even after long storage or storage at a high temperature.

By producing an ink selecting two or more chromatic pigments of different colors from the aforesaid group, an ink which can produce light and finer hue and is very stable in color development performance (free from discoloring) can be obtained.

DETAILED DESCRIPTION OF THE INVENTION

The present invention will be described in more detail with reference to embodiments, hereinbelow.

The light color W/O emulsion ink for stencil printing in accordance with the present invention is characterized by containing therein chromatic pigment in an amount not smaller than 0.1% and smaller than 1% by weight of the total weight of the ink and white pigment in an amount not smaller than 7% and not larger than 20% by weight of the total weight of the ink.

As described above, the light color W/O emulsion ink for stencil printing of the present invention produces the same color irrespective of the kind or the color of the printing paper. It may be considered that this is because the opaque white pigment hides the color of the printing paper and acts as the ground, whereby the same color as that obtained when the ink is transferred to a high whiteness printing paper is obtained. When the content of the white pigment is smaller than 7% by weight, whiteness, hiding power and the like of the white pigment becomes insufficient. To the contrast, when the content of the white pigment is larger than 20% by weight, adjustment of viscosity of ink and maintenance of stability against storage become difficult. From these viewpoints, it is especially preferred that the content of white pigment is in the range of 10% by weight to 20% by weight.

Titanium oxide, zinc sulfide, lithopone, zinc white, white lead and the like may be employed as the white pigment. Among those, titanium oxide is preferred because of its excellent whiteness, hiding power, coloring power and weather resistance. The titanium oxide may be any titanium oxide known as pigment and preferably is 0.1 to 0.5 $\mu$m in primary particle size. Among various titanium oxides, titanium oxides of rutile structure are especially excellent in hiding power and weather resistance and are preferred. The white pigment may be contained in either of the oil phase and the water phase. However, since the oil phase penetrates the printing paper more rapidly than the water phase, the white pigment is apt to cover the chromatic pigment to hide it if the white pigment is contained in the water phase and the chromatic pigment is contained in the oil phase. Accordingly, it is preferred that when the chromatic pigment is contained in the oil phase, the white pigment be contained also in the oil phase.

The content of the chromatic pigment (when two or more kinds of chromatic pigments are contained, the total amount of the chromatic pigments) should be not smaller than 0.1% and smaller than 1% by weight of the total weight of the ink. Preferably the content of the chromatic pigment is not larger than 0.4% by weight of the total weight of the ink. When the content of the chromatic pigment is as small as 0.1 to 1% by weight, the ink generally cannot produce an expected color on the printing. However, in the case of the ink of the present invention, the ink can produce an expected color on the printing by virtue of the white pigment.

As the chromatic pigment, known pigments of various colors may be employed. However since inorganic pigments are generally poor in coloring power and sharpness, organic pigments are preferred to inorganic pigments. As such organic pigments, insoluble azo-pigments such as β-naphthol series pigments, naphthol AS series pigments, acetoacetic anilide series pigments, pyrazolone series pigments and the like (e.g., disazo yellow and lake red 4R); soluble azo-pigments such as Ca lake, Ba lake, Sr lake, Mn lake and like (e.g., brilliant carmine 6B, lake red C and Watchung red); basic lake pigments such as tannic acid lake, phosphomolybdic acid lake, phosphotungstic acid lake and phosphomolybdictungstic acid lake (e.g., Rhodamine B lake, Rhodamine 6G lake and Methyl Violet Lake), acidic lake pigments such as Ba lake, Ca lake, Al lake and Pb lake (e.g., orange II lake and quinoline yellow lake), anthraquinone series pigments, perinone.perylene series pigments, phthalocyanine series pigments, dioxazine series pigments, quinacridone series pigments and isoindolinone series pigments and the like can be employed.

However, some of soluble and insoluble azo-pigments and basic and acidic lake pigments discolor, which results change in hue, deterioration in chroma and increase in brightness of the ink. Accordingly, anthraquinone series pigments, perinone.perylene series pigments, phthalocyanine series pigments, dioxazine series pigments, quinacridone series pigments and isoindolinone series pigments are preferred. Since these pigments are excellent in weather resistance in a W/O emulsion ink, and are less apt to discolor, the emulsion ink containing therein such a chromatic pigment is stable in its hue, chroma, brightness and color development performance. When the content of the chromatic pigment is as small as not larger than 0.4% by weight, these pigments are especially preferable.

As the anthraquinone series pigments, dianthraquinonyl red, indanthrone blue, anthanthrone orange, anthrapyrimidine yellow, flavanthrone yellow and the like may be used. As the perinone.perylene series pigments, perinone orange, perylene red, perylene violet, perylene maroon, perylene scarlet, perylene vermilion, and the like may be used. As the phthalocyanine series pigments, phthalocyanine blue, phthalocyanine green and the like may be used. As the dioxazine series pigments, for instance, carbazole violet may be used. As the quinacridone series pigments, quinacridone red, quinacridone magenta, dichloroquinacridone magenta, quinacridone scarlet, and the like may be used. As the isoindolinone series pigments, isoindolinone yellow R, isoindolinone yellow G, isoindolinone orange and the like may be used.

One of the chromatic pigments may be used alone or two or more of the chromatic pigments may be used in combination. When two or more chromatic pigments of different colors are used, an ink which can produce light and finer can be obtained. When two or more chromatic pigments are used, they may be of the same series or the different series. The chromatic pigment may be contained in either the oil phase or the water phase. However when two or more chromatic pigments of different hues are employed, it is preferred that all the chromatic pigments be contained in one of the oil phase and the water phase to prevent color separation.

The oil phase basically comprises chromatic pigments, white pigments, emulsifier, oil components and the like. When the water phase contains pigments, the oil phase need not contain pigments.

The emulsifier is for forming W/O emulsion and may be any of anion surface active agents, cation surface active agents, amphoteric surface active agents and nonionic surface active agents. From the viewpoints of emulsification of the W/O emulsion and the storage stability, nonionic surface active agent is preferred. For example, fatty acid esters of sorbitan such as sorbitan monolaurate, sorbitan monopalmitate, sorbitan monooleate, sorbitan sesquioleate, sorbitan monoisostearate, and the like; glycerides such as glyceryl monostearate, hexaglyceryl tetraoleate, decaglyceryl decaoleate, hexaglyceryl pentaoleate and the like; fatty acid esters of polyoxyethylene sorbitan; fatty acid esters of polyoxyethylene glycerin; fatty acid esters of polyoxyethylene sorbitol; fatty acid esters of propylene glycol fatty acid esters of (poly)ethylene glycol; polyoxyethylene alkylether; polyoxyethylenepolyoxypropylene alkylether; polyoxyethylene alkylphenylether; and polyoxyethylene (hydrogenated) castor oil may be suitably used. One emulsifier may be used alone or two or more kinds of emulsifiers may be used in combination. The content of the emulsifier is preferably 0.1 to 10% by weight of the total weight of the ink, and more preferably 1 to 5% by weight of the total weight of the ink.

As the oil components, various industrial solvents; mineral oils such as motor oil, gear oil, gas oil, kerosene, spindle oil, machine oil, liquid paraffin and the like; vegetable oils such as olive oil, colza oil, castor oil, linseed oil, salad oil, soybean oil and the like; as well as synthetic oils can be suitably employed. It is preferred that a mixture of a plurality of oils different in volatility is employed in order to improve, for instance, printing performance after the printer is kept unoperated for a long time.

It is preferred that the oil phase contains resin, and if desired the oil phase may contain extending pigment, gelling agent, antioxidant, pigment dispersant and the like.

As the resin, those which are soluble in the oil phase are employed, and the resin is employed to provide a viscosity to the ink and to increase stability of the emulsion. When the oil phase contains therein chromatic pigment, white pigment and extending pigment, the resin improve the dispersion of the pigments and enhances fixing to the printing paper of the pigments. For example, rosin, gilsonite, rosin ester, maleic acid resin, phenol resin, alkyd resin, petroleum resin, acrylic resin, amino resin, urethane resin, cellulose resin, natural rubber derivative resin and the like may be suitably used. Among those, phenol resin and alkyd resin are especially preferred. Further, reaction products with aluminum chelate compounds such as disclosed in Japanese Unexamined Patent Publication No. 2000-7972 may be suitably used. The content of resin is preferably 1 to 20% by weight of the total weight of the ink, and more preferably 3 to 15% by weight of the total weight of the ink.

The main component of the water phase is water. When the oil phase does not contain a chromatic pigment and a white pigment, the water phase contains a chromatic pigment and a white pigment. The chromatic pigment may be those described above as chromatic pigments which may be contained in the oil phase. Among those, anthraquinone series pigments, perinone.perylene series pigments, phthalocyanine series pigments, dioxazine series pigments, quinacridone series pigments and isoindolinone series pigments are preferred. The white pigment may be those described above as white pigments which may be contained in the oil phase. Among those, titanium oxide is preferred and among various titanium oxides, titanium oxides of rutile structure are especially preferred.

It is preferred that the water phase includes evaporation retardant and antifreezing agent. For example, water-soluble organic solvents, e.g., polyhydric alcohols such as ethylene glycol, propylene glycol, diethylene glycol, polyethylene glycol and glycerin, may be employed. The content of such components is preferably 1 to 20% by weight of the total weight of the water phase, and more preferably 3 to 15% by weight of the total weight of the water phase.

It is preferred that the water phase further includes electrolytes and pH adjustors. For example, sodium sulfate, magnesium sulfate, potassium hydrogenphosphate, sodium citrate, potassium tartrate, sodium borate and triethanolamine are suitable. The content of such components is preferably 0.1 to 2% by weight of the total weight of the water phase, and more preferably 0.3 to 1.5% by weight of the total weight of the water phase.

If necessary, the water phase may include O/W resin emulsion and/or water-soluble resin. When chromatic pigment, white pigment and/or extending pigment are added to the water phase, the O/W resin emulsion and/or water soluble resin improve wettability and dispersion of the pigments and enhances fixing to the printing paper of the pigments.

As the O/W resin emulsion, emulsions of polyvinyl acetate, ethylene-vinyl acetate copolymer, vinyl acetate-acrylic ester copolymer, polymethacrylic ester, polystyrene, styrene-acrylic ester copolymer, styrene-butadiene copolymer, vinylidene chloride-acrylic ester copolymer, polyvinyl chloride, vinyl chloride-vinyl acetate copolymer and polyurethane are suitable.

As the water-soluble resin, polyvinyl alcohol, methyl cellulose, carboxymethyl cellulose, hydroxymethyl cellulose, polyvinylpyrrolidone, polyethylene-polyvinyl alcohol copolymer, polyethylene oxide, polyvinyl ether, polyacrylamide, gum Arabic, starch, water-soluble urethane and the like are suitable.

In order to improve wettability and dispersion of the pigments, anion surface active agents, cation surface active agents, amphoteric surface active agents, nonionic surface active agents, high-polymer surface active agents, silicone surface active agents, fluorine surface active agents, tertiary amine compounds disclosed in Japanese Unexamined Patent Publication No. 8(1996)-34944 and acid anhydride-containing water-soluble polymers disclosed in Japanese Unexamined Patent Publication No. 10(1998)-1634 may be added to the water phase. The tertiary amine compounds and the acid anhydride-containing water-soluble polymers are preferred.

Extending pigments, preservatives, antifungal agents, antioxidants and the like may be added to the water phase as desired.

The W/O emulsion ink of the present invention is generally produced by gradually adding 50 to 85% by weight of water phase to 15 to 50% by weight of oil phase and emulsifying the mixture. The present invention will be described in further detail with reference to an example, hereinbelow.

EXAMPLE

W/O emulsion inks were produced in the manner described in the following embodiments 1 to 4 and the following comparative examples 1 and 2 employing compositions shown in the following table 1. The values in the following table 1 are in terms of % by weight.

Embodiment 1

A liquid mixture of quinacridone magenta, alkyd resin, paraffin series solvent, polyglyceryn fatty acid ester and polyoxyethylene castor oil and a liquid mixture of titanium oxide (with a rutile structure), alkyd resin, paraffin series solvent, polyglyceryn fatty acid ester and polyoxyethylene castor oil were separately dispersed well with a triple roll mill. The resultant dispersions were introduced into an emulsifier together with spindle oil and olefin in series solvent and the mixture were stirred, thereby obtaining an oil phase. A mixed solution of ion-exchanged water, glycerin and magnesium sulfate were dropped in the oil phase little by little with the agitating element rotated. In this manner, emulsification were continued until a desired viscosity is obtained, whereby light red purple emulsion ink for stencil printing was obtained.

Embodiment 2

Light purple blue emulsion ink for stencil printing of a second embodiment was obtained in the same manner as the first embodiment except that the composition was as shown in the following table 1.

Embodiment 3

Light red emulsion ink for stencil printing of a third embodiment was obtained in the same manner as the first embodiment except that the composition was as shown in the following table 1.

Embodiment 4

Light red purple emulsion ink for stencil printing of a fourth embodiment was obtained in the same manner as the first embodiment except that the composition was as shown in the following table 1.

Comparative Example 1

Light red purple emulsion ink for stencil printing of a first comparative example was obtained in the same manner as the first embodiment except that the composition was as shown in the following table 1.

Comparative Example 2

Light red purple emulsion ink for stencil printing of a second comparative example was obtained in the same manner as the first comparative example except that the composition was as shown in the following table 1.

TABLE 1

|  | emb 1 | emb 2 | emb 3 | emb 4 | ex 1 | ex 2 |
|---|---|---|---|---|---|---|
| oil phase |  |  |  |  |  |  |
| quinacridone magenta | 0.2 | — | — | 0.1 | 0.8 | 0.2 |
| carbazole violet | — | 0.1 | — | — | — | — |
| phthalocyanine blue | — | 0.1 | — | 0.1 | — | — |
| watchung red | — | — | 0.2 | 0.1 | — | — |
| titanium oxide (rutile) | 14.0 | 14.0 | 14.0 | 14.0 | — | 5.0 |
| alkyd resin | 10.0 | 10.0 | 10.0 | 10.0 | 14.0 | 12.5 |
| spindle oil | 1.8 | 1.8 | 1.8 | 1.7 | 9.2 | 7.8 |
| paraffin series solvent | 8.0 | 8.0 | 8.0 | 8.0 | 10.0 | 8.5 |
| olefin series solvent | 3.0 | 3.0 | 3.0 | 3.0 | 3.0 | 3.0 |
| polyglyceryn fatty acid ester | 1.5 | 1.5 | 1.5 | 1.5 | 1.5 | 1.5 |
| polyoxyethylene castor oil | 0.5 | 0.5 | 0.5 | 0.5 | 0.5 | 0.5 |
| water phase |  |  |  |  |  |  |
| ion-exchanged water | 55.0 | 55.0 | 55.0 | 55.0 | 55.0 | 55.0 |
| glycerin | 5.5 | 5.5 | 5.5 | 5.5 | 5.5 | 5.5 |
| magnesium sulfate | 0.5 | 0.5 | 0.5 | 0.5 | 0.5 | 0.5 | emb = embodiment
ex = comparative example

Using the stencil printing W/O emulsion inks of the first to fourth embodiments and the first and second comparative examples, printing was made by a stencil printer, RISOGRAPH® GR275 (RISO KAGAKU CORPORATION). Wood free paper 82 degree in Hunter whiteness, regenerated paper 57 degree in Hunter whiteness and color (green) wood free paper were used as the printing paper.

The inks of the first to fourth embodiments produced images of equivalent colors on the different printing papers. To the contrast, the inks of the first and second comparative examples, containing no titanium oxide and containing titanium oxide in 5% by weight, produced images of dark red purple on the regenerated paper and of dark blue on the color wood free paper.

Further, the stencil printing emulsion inks of the first to fourth embodiments were contained in a sealed contained and stored for ten days at 70° C. Thereafter, using the stencil printing emulsion inks, printing was made on wood free paper 82 degree in Hunter whiteness by a stencil printer, RISOGRAPH® GR275 (RISO KAGAKU CORPORATION).

The inks of the first and second embodiments, containing quinacridone series pigment (quinacridone magenta), dioxazine series pigment (carbazole violet) and phthalocyanine series pigments (phthalocyanine blue), after the storage produced images of colors equivalent to those printed by the same inks before the storage. To the contrast, the ink of the third embodiment, containing soluble azo-pigment (watchung red), after the storage produced an image of color lighter than that printed by the same ink before the storage and the ink of the fourth embodiment, containing soluble azo-pigment (watchung red), after the storage produced an image of color bluish as compared with that printed by the same ink before the storage.

As can be understood from the description above, the inks of the embodiments of the present invention can produce images of the same light colors irrespective of the kind of the printing paper.

What is claimed is:

1. A light color W/O emulsion ink for stencil printing, comprising an oil phase and a water phase wherein the ink contains a chromatic pigment in an amount not smaller than 0.1% and smaller than 1% by weight of the total weight of the ink and contains titanium oxide of a rutile structure as a white pigment in an amount not smaller than 7% and not larger than 20% by weight of the total weight of the ink.

2. A light color W/O emulsion ink for stencil printing as defined in claim 1 in which the content of the oil phase is 15 to 50% by weight of the total weight of the ink and the content of the water phase is 50 to 85% by weight of the total weight of the ink.

3. A light color W/O emulsion ink for stencil printing as defined in claim 1 in which the chromatic pigment is at least one of a pigment selected from the group consisting of anthraquinone series pigments, pennone.perylene series pigments, phthalocyanine series pigments, dioxazine series pigments, quinacridone series pigments and isoindolinone series pigments.

4. A light color W/O emulsion ink for stencil printing as defined in claim 3 in which the chromatic pigment comprises two or more of chromatic pigments of different colors selected from the group consisting of anthraquinone series pigments, perinone.perylene series pigments, phthalocyanine series pigments, dioxazine series pigments, quinacridone series pigments and isoindolinone series pigments.

5. A method of stencil printing comprising the step of printing on a low whiteness printing paper or a color printing paper with the light color W/O emulsion ink for stencil printing as defined in claim 1.

6. A light color W/O emulsion ink for stencil printing as defined in claim 1 in which the chromatic pigment and white pigment are present only in the oil phase.

* * * * *